Dec. 15, 1964     T. PETREE     3,161,279
BOOTLESS GRAIN ELEVATOR

Filed Sept. 11, 1961     2 Sheets-Sheet 1

INVENTOR
TROY PETREE

BY *Beale and Jones*
ATTORNEYS

Dec. 15, 1964     T. PETREE     3,161,279
BOOTLESS GRAIN ELEVATOR

Filed Sept. 11, 1961     2 Sheets-Sheet 2

INVENTOR
TROY PETREE

BY Blake and Jones
ATTORNEYS

United States Patent Office 3,161,279
Patented Dec. 15, 1964

3,161,279
BOOTLESS GRAIN ELEVATOR
Troy Petree, Caldwell, Idaho
(P.O. Box 412, Branson, Mo.)
Filed Sept. 11, 1961, Ser. No. 137,220
4 Claims. (Cl. 198—55)

This invention comprises an elevator for grain or the like of the bucket and chain variety which is completely leak proof and self-cleaning and which requires no boot at the bottom of the supply hopper.

In a common form of grain elevator, a spaced series of buckets mounted upon an endless chain is used to convey the grain or the like from a lower supply hopper to an upper receiving hopper. The supply hopper normally has a boot at its lower end in which the grain collects and through which the spaced buckets pass to pick up the grain and elevate it. This boot tends to become filled and clogged with the grain, requiring frequent removal and cleaning.

It is an additional characteristic of many such grain elevators that they must be operated at a high rate of speed in order to prevent the grain from overflowing and spilling down past the buckets as they are loaded from the supply hopper. This causes the grain to be flung with considerable force from the high speed buckets as they unload, usually resulting in quite a bit of spillage and mess.

It is an object of this invention to provide a bucket and chain type grain elevator in which no boot is required at the bottom of the supply hopper.

It is a further object of this invention to provide such an elevator which is completely self-cleaning and leak proof, that is in which all of the grain is conveyed upward by the buckets and none is allowed to fall down below the buckets to the floor.

It is an additional object of this invention to provide such an elevator which may be operated at slow speed, thereby allowing the grain as it is unloaded from the buckets into the receiving hopper to be poured rather than flung from the buckets.

It is a further object to provide such an elevator that is inexpensive to build and to operate.

This invention, briefly, fulfills these objectives by providing a loading sleeve at the bottom of the supply hopper and chain-mounted buckets which pass up through this loading sleeve making a close sliding fit with the inner wall thereof, thus not permitting any grain to fall down between the buckets and the wall of the loading sleeve. By spacing the buckets closely enough upon the chain so that one bucket is within the loading sleeve at all times, the chain may be run as slowly as desired and still prevent any grain from escaping down below the supply hopper and sleeve.

The invention will be more readily understood with reference to the specific embodiment described below and in the attached drawings in which.

Figure 1:
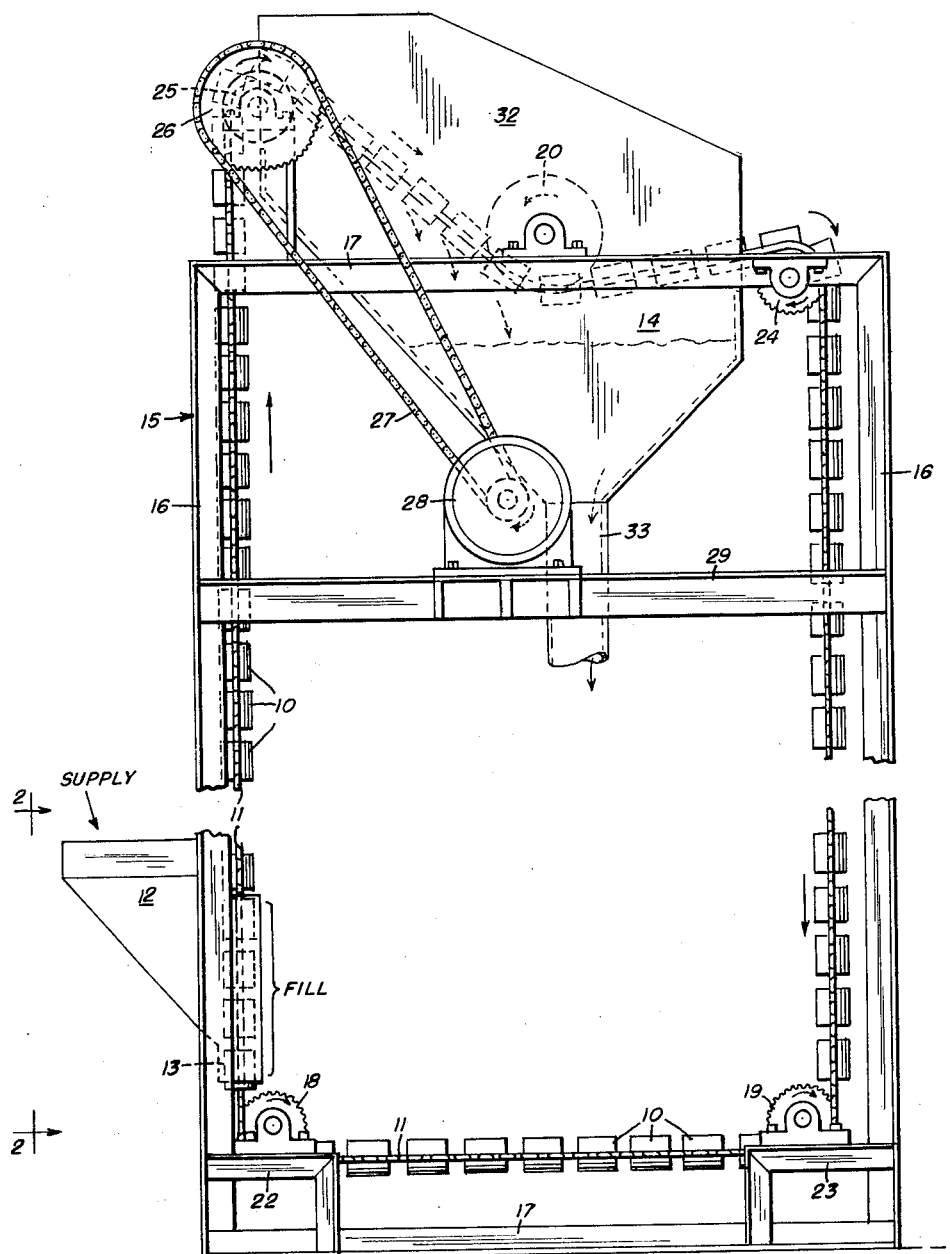
FIGURE 1 is a front elevation of the complete grain elevator.

Referring now to FIGURE 1, a spaced series of buckets 10 mounted upon endless chain 11 pass upward through supply hopper 12 and its loading sleeve 13 (shown dotted) where they are filled with the grain in the supply hopper, the grain not being shown, and carry the grain upward and pour it into receiving hopper 14.

The elevator can be mounted upon any convenient frame, the structure of which is not critical. Frame 15, used with this embodiment, comprises two spaced rectangular frames (only one of which can be seen in the frontal elevation of FIGURE 1), each formed of two parallel upright members 16 and two parallel horizontal members 17 suitably attached to form a rigid rectangle. The two spaced rectangles may be rigidly connected in spaced relationship by any well known structural means, with the connection not being shown in the drawings.

Chain 11 runs on sprockets attached to frame 15. Two lower idler sprockets 18 and 19 are mounted upon the horizontal portion of angled pedestals 22 and 23 which are attached to the lower corners of frame 15. Idler sprocket 24 is mounted near the upper right-hand corner of rectangular frame 15, and idler sprocket 20 (shown dotted) is mounted near the center of the upper horizontal member 17. The chain drive sprocket 25 (shown dotted) is mounted somewhat above the upper left-hand corner of frame 15. It receives its power from the main drive sprocket 26 which is fixedly attached to the same shaft, and which is driven by chain 27 from motor 28 which is mounted on frame crosspiece 29. Receiving hopper 14, whose structure is not a part of this invention, is shown with two sides 32 which extend up well above the top of frame 15 to form splash plates and with a discharge spout 33 at its bottom.

In operation, chain 11 moves in a clockwise direction as viewed in FIGURE 1, with buckets 10 filling as they pass upward through loading sleeve 13 and supply hopper 12. The buckets then pass over chain drive sprocket 25 after which the chain is depressed downwardly as it passes under idler sprocket 20 and the grain is poured or dumped from buckets 10 into hopper 14. The empty buckets then complete their circuit back around to the loading sleeve and supply hopper.

Figure 2:
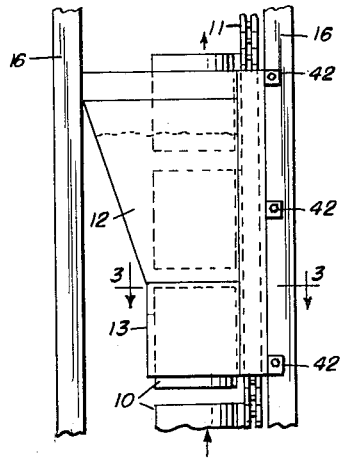
FIGURE 2 is a fragmentary side elevation taken along line 2—2 of FIGURE 1, showing in greater detail the supply hopper, loading sleeve and buckets passing therethrough.
Figure 3:
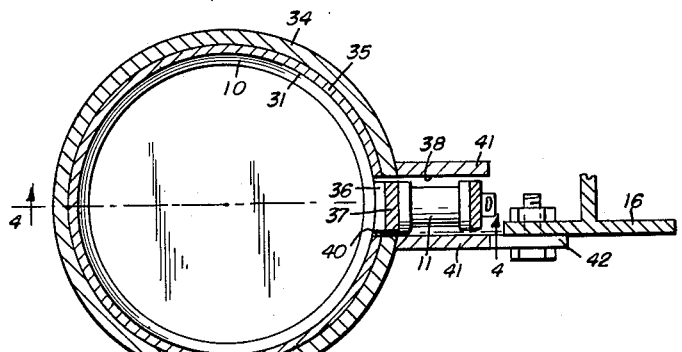
FIGURE 3 is a horizontal section taken along line 3—3 of FIGURE 2.
Figure 4:
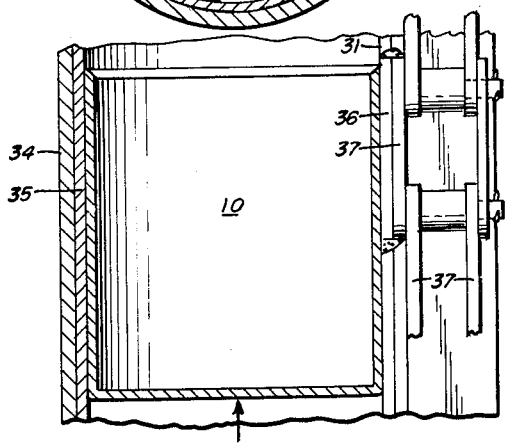
FIGURE 4 is a vertical section taken along line 4—4 of FIGURE 3.

FIGURES 2, 3, and 4 show the detailed structure of loading sleeve 13, buckets 10 and associated structure which form the heart of the invention. FIGURE 2 is a fragmentary front elevation of supply hopper 12, loading sleeve 13 and buckets 10 and shows fragments of the two spaced portions of frame 15, only one of which could be seen in the front elevation of FIGURE 1.

Loading sleeve 13, as shown in FIGURES 3 and 4, is preferably composed of an outer loading collar 34 and an inner bushing 35, preferably of bronze. The use of the bushing, though forming the preferred construction of the loading sleeve, is of course not essential to the invention. Bucket 10 is shown as conforming closely to the inner wall 31 of bushing 35, which is also referred to herein as the inner wall of loading sleeve 13. The fit of the bucket within inner wall 31 must be loose enough to allow a sliding fit with a minimum of friction, yet tight enough to prevent the passage therethrough or the lodging therebetween of particles of grain or the like with which the elevator is to be used. Inner wall 31 of loading sleeve 13 should be cylindrical, with "cylindrical" being used in its broad sense as meaning of uniform cross section, comprising a surface which may be generated by a straight line moving around a closed curve and remaining parallel to a given direction. The preferred configuration of the inner wall of the loading sleeve is a right circular cylinder, as shown and described in this embodiment, but of course the invention will work with a loading sleeve having an inner wall of any desired cross-sectional configuration, as long as the cross section remains constant throughout the extent of the loading sleeve and the bucket fits closely within it. It is also not necessary that the bucket be of cylindrical configuration, as is shown here, where it contacts the inner wall over its entire cylindrical surface; it is sufficient that the cross section of the loading bucket fit closely within the loading sleeve inner surface at only the top of the bucket; for instance, a conical bucket will be satisfactory. This will be sufficient to prevent grain from escaping down between the outer periphery of the bucket and the inner wall of the loading sleeve.

The bucket of this embodiment is shown as conveniently welded to a spacer 36 which is in turn welded to a side bar 37 which forms part of a link in chain 11.

While the buckets 10 are passing upward through loading sleeve 13, the chain 11 to which buckets 10 are attached is proivded for by a channel 38 which is formed by a vertical slot 40 in the wall of loading sleeve 13 and two parallel vertical flanges 41. The walls of channel 38 fit closely enough to the sides of chain 11 to prevent the passage of any of the grain or the like therebetween. The side bars 37 of chain 11 should be of such a configuration that when the chain is passing up through channel 38, the connected and overlapping series of side bars 37 present an essentially solid wall facing inward toward loading sleeve 13; that is, they present a surface essentially solid enough to prevent any particles of the grain or the like from penetrating into the slot and clogging the chain or escaping down to the floor.

Thus, with the circumference of bucket 10 fitting closely within inner wall 31 of loading sleeve 13, the sides of channel 38 fitting closely to the sides of chain 11, and the inward facing portion of chain 11 being essentially impervious to the penetration of the grain particles, it may be seen that substantially none of the grain in supply hopper 12 and loading sleeve 13 will be able to escape down below the level of loading sleeve 13.

Supply hopper 12 and loading sleeve 13 may be connected to frame 15 by any convenient means; here brackets 42 extend from one of the parallel vertical flanges 41 and are bolted to an upright member 16.

Buckets 10 are preferably spaced closely enough so that some portion of one bucket is always fitting closely within loading sleeve 13; each succeeding bucket enters into closely fitting relationship with the loading sleeve inner wall before the preceding bucket has left its closely fitting relationship. There will then be no chance for the grain to spill past the buckets or overflow out of the buckets no matter how slowly the chain is moving. This invention thus proivdes a grain elevator which may be operated as slowly as desired; and grain discharge from high speed buckets, which would result in a flinging action which is difficult to contain and tends to result in a lot of spillage and mess, may be avoided. With a more slowly moving chain, the grain will be poured rather than flung from the buckets into the receiving hopper, in an action which is much more easily contained and controlled.

It will be seen from the foregoing description and from the drawings that the grain elevator described herein compirses, in fact, an improved self-cleaning bootless grain elevator adapted for convenient slow speed operation and having no intricate or complex parts, thus making it easy and inexpensive to manufacture and use. It is of course understood that a preferred embodiment has been described and that various modification may be made in the preferred structure without departing from the scope of the invention as defined and delineated in the claims.

I claim:

1. An elevator for grain or the like comprising: a supply hopper in which is placed grain or the like to be elevated; said supply hopper terminating at its lower end in a loading sleeve, said supply hopper having a wall sloping upwardly and outwardly from adjacent the top of said loading sleeve and said hopper increasing in cross sectional area to proivde sidewise movement of grain for filling said buckets, said loading sleeve having an inner wall forming a cylinder open at both ends, said upper open end of the cylinder directly communicating with and in alignment with the lower end of the hopper and in alignment with a portion of the supply hopper throughout the major portion of its height; a series of spaced buckets attached to an endless chain; means to drive said chain whereby said buckets move upwardly through said loading sleeve and supply hopper and are filled with and elevate the grain or the like placed therein, a plurality of said buckets passing through said portion of the supply hopper and simultaneously receiving directly grain from said hopper; the periphery of each of said buckets fitting closely enough to said inner wall of said loading sleeve to prevent the entrance therebetween of particles of the grain or the like.

2. The elevator of claim 1 in which said buckets are so spaced on said chain that each succeeding bucket enters into closely fitting relationship with said inner wall of said loading sleeve before the bucket preceding it has left its closely fitting relationship with said wall.

3. The elevator of claim 1 in which said chain is attached to the exterior of and extends outwardly beyond the periphery of each said bucket; a channel extending outwardly of said cylindrical inner wall of said loading sleeve and accommodating said chain, said channel fitting closely enough to said chain to prevent the entrance of particles of the grain or the like between said chain and said channel; the side of said chain facing said loading sleeve being essentially impervious to the penetration of particles of the grain or the like.

4. In a self-cleaning elevator for conveying grain the combination comprising, a supply hopper for receiving grain having a loading sleeve at the lower end thereof, said hopper having a wall sloping upwardly and outwardly from the top of said loading sleeve and increasing in cross sectional area to provide sidewise movement of grain to fill said buckets simultaneously, a single continuous chain with means to drive said chain, and a plurality of buckets each attached to said chain at particular spaced apart intervals so that several of said buckets directly and simultaneously receive grain while passing through said supply hopper, one of said buckets successively remaining in close fitting relationship with said sleeve so that none of said grain can escape from said supply hopper when the buckets are moved upwardly through said supply hopper by movement of said chain.

References Cited by the Examiner
UNITED STATES PATENTS

| 1,015,570 | 1/12 | Locke | 198—55 X |
| 1,254,690 | 1/18 | Hazard | 198—55 X |
| 2,347,437 | 4/44 | Saxe | 198—55 X |
| 2,547,476 | 4/51 | Lehman | 198—55 |
| 2,919,792 | 1/60 | Kirkhart et al. | 198—55 X |

SAMUEL F. COLEMAN, *Acting Primary Examiner.*

JULIUS E. WEST, WILLIAM B. LA BORDE,
*Examiners.*